(12) United States Patent
Maruyama et al.

(10) Patent No.: US 10,795,482 B2
(45) Date of Patent: Oct. 6, 2020

(54) TOUCH PANEL AND ELECTRONIC DEVICE

(71) Applicant: Sharp Kabushiki Kaisha, Sakai, Osaka (JP)

(72) Inventors: Takenori Maruyama, Sakai (JP); Jean Mugiraneza, Sakai (JP); Yasuhiro Sugita, Sakai (JP); Hidetsugu Kawamori, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/490,911

(22) PCT Filed: Mar. 1, 2018

(86) PCT No.: PCT/JP2018/007871
§ 371 (c)(1),
(2) Date: Sep. 4, 2019

(87) PCT Pub. No.: WO2018/163972
PCT Pub. Date: Sep. 13, 2018

(65) Prior Publication Data
US 2020/0019267 A1     Jan. 16, 2020

(30) Foreign Application Priority Data
Mar. 7, 2017  (JP) ................................ 2017-042806

(51) Int. Cl.
*G06F 3/041*   (2006.01)
*G06F 3/044*   (2006.01)
(Continued)

(52) U.S. Cl.
CPC ...... *G06F 3/0412* (2013.01); *G02F 1/133512* (2013.01); *G02F 1/133514* (2013.01);
(Continued)

(58) Field of Classification Search
CPC ..... G02F 1/136209; G02F 2001/13396; G02F 2201/123; G02F 2001/13398;
(Continued)

(56) References Cited

U.S. PATENT DOCUMENTS

2006/0120543 A1*  6/2006  Kobayashi ........ G02F 1/133308
                                                      381/152
2006/0227981 A1* 10/2006  Miyata ..................... H04R 7/04
                                                      381/124
(Continued)

FOREIGN PATENT DOCUMENTS

JP    2013-131110 A    7/2013
JP    2014-164770 A    9/2014
(Continued)

OTHER PUBLICATIONS

Maruyama et al.; "Touch Panel and Electronic Device"; U.S. Appl. No. 16/490,909, filed Sep. 4, 2019.

*Primary Examiner* — Michael J Eurice
(74) *Attorney, Agent, or Firm* — Keating & Bennett, LLP

(57) ABSTRACT

The purpose of the present invention is to achieve further miniaturization and performance improvement in a pressure detection type touch panel. The touch panel (1) includes a TP upper side electrode layer (19) located above the CF substrate (18), a TP lower side electrode layer (15) located below the CF substrate (18) and above the liquid crystal layer (14), and a piezoelectric element layer (16) located between the TP upper side electrode layer (19) and the TP lower side electrode layer (15).

4 Claims, 5 Drawing Sheets

(51) Int. Cl.
*G02F 1/1335* (2006.01)
*G02F 1/1333* (2006.01)

(52) U.S. Cl.
CPC .. *G06F 3/044* (2013.01); *G02F 2001/133394* (2013.01); *G06F 3/041* (2013.01)

(58) Field of Classification Search
CPC ............... G02F 1/1333; G02F 1/13338; G02F 2001/133394; G02F 1/133512; G02F 1/133514; G02F 1/13394; G02F 1/134363; G06F 3/041; G06F 3/0412; G06F 3/0414; G06F 3/0416; G06F 3/044; G06F 3/0445; G06F 3/0446; G06F 2203/04103; G06F 2203/04105; G06F 2203/04106; G06F 2203/04108
See application file for complete search history.

(56) References Cited

U.S. PATENT DOCUMENTS

| | | | |
|---|---|---|---|
| 2010/0295807 A1* | 11/2010 | Xie | G06F 3/0414 345/173 |
| 2011/0063239 A1* | 3/2011 | Xie | G06F 3/0414 345/173 |
| 2012/0242610 A1* | 9/2012 | Yasumatsu | H01L 27/323 345/173 |
| 2012/0262631 A1* | 10/2012 | Kuromizu | G02F 1/133605 348/725 |
| 2014/0063365 A1* | 3/2014 | Li | G06F 3/0412 349/12 |
| 2014/0078104 A1 | 3/2014 | Lee et al. | |
| 2015/0355771 A1 | 12/2015 | Watazu et al. | |
| 2016/0266709 A1 | 9/2016 | Kurasawa | |
| 2016/0357292 A1 | 12/2016 | Suzuki et al. | |
| 2016/0357331 A1* | 12/2016 | Kano | G06F 3/044 |
| 2017/0127166 A1* | 5/2017 | Noma | G02F 1/133606 |
| 2017/0163778 A1* | 6/2017 | Noma | H04M 1/03 |
| 2017/0288155 A1* | 10/2017 | Kurihara | C07F 15/0033 |
| 2018/0095582 A1* | 4/2018 | Hwang | H01L 27/322 |
| 2018/0166507 A1* | 6/2018 | Hwang | G06F 3/0416 |
| 2019/0252435 A1* | 8/2019 | Chu | G06F 3/042 |
| 2020/0012134 A1* | 1/2020 | Maruyama | G02F 1/133514 |

FOREIGN PATENT DOCUMENTS

| | | |
|---|---|---|
| JP | 2014-186711 A | 10/2014 |
| JP | 5871111 B1 | 3/2016 |
| JP | 2016-170730 A | 9/2016 |
| JP | 2016-224808 A | 12/2016 |
| WO | WO-2015194476 A1 * 12/2015 | ........... G02B 6/0078 |

* cited by examiner

TOUCH PANEL AND ELECTRONIC DEVICE

TECHNICAL FIELD

An aspect of the present invention relates to a touch panel having both an input position detection function and a pressure detection function.

BACKGROUND ART

In recent years, in some of touch panels (TP), a function for detecting that pressure is applied to an input surface (display surface) (hereinafter, pressure detection) has been added in addition to the related input position detection function. Various techniques have been proposed for a touch panel having both the input position detection function and the pressure detection function (hereinafter, also referred to as a pressure detection type touch panel).

For example, PTL 1 discloses a technique for maintaining the accuracy of pressure detection even when the touch panel is miniaturized (with a reduced total number of films) in the pressure detection type touch panel.

Specifically, the touch panel disclosed in PTL 1 includes a touch panel unit provided with two touch panel electrodes (first touch panel electrode and second touch panel electrode), and a pressure sensor unit provided with two pressure sensor electrodes (first pressure sensor electrode and a second pressure sensor electrode).

Then, an electrode layer provided with the first pressure sensor electrode (first pressure sensor electrode layer) is formed as the same electrode layer as an electrode layer provided with the second touch panel electrode (second touch panel electrode layer).

CITATION LIST

Patent Literature

PTL 1: Japanese Patent No. 5871111 (issued on Mar. 1, 2016)

SUMMARY OF INVENTION

Technical Problem

However, in the technique of PTL 1, the following two problems are found, for example.

(1): The electrode layer provided with the second pressure sensor electrode (second pressure sensor electrode layer) is not the same electrode layer as any of the electrode layer provided with the first touch panel electrode (first touch panel electrode layer) and the second touch panel electrode layer described above. For this reason, in order to provide the second pressure sensor electrode layer, since an individual substrate (for example: film or glass) and an adhesive layer are needed, the thickness of a touch panel is increased.

(2): In addition, there is a possibility that unintended capacitive coupling may occur between the second pressure sensor electrode layer and other members. For this reason, there is a possibility that noise of the touch panel may be increased due to the capacitive coupling.

Thus, there is still room for improvement with regard to miniaturization and performance improvement in the pressure detection type touch panel. An aspect of the present invention is to realize further miniaturization and performance improvement in the pressure detection type touch panel.

Solution to Problem

In order to solve the problems, according to an aspect of the present invention, there is provided a touch panel having a display surface, including a pixel substrate, a liquid crystal layer, and a color filter layer in order from a side farthest from the display surface in which when a direction from the pixel substrate toward the color filter layer is defined as an upper direction and a direction opposite to the upper direction is defined as a lower direction, the touch panel further includes a touch panel upper side electrode layer located above the color filter layer; a touch panel lower side electrode layer located below the color filter layer and above the liquid crystal layer; and a first piezoelectric element layer that generates a voltage in accordance with pressing on the display surface in which the touch panel upper side electrode layer and the touch panel lower side electrode layer are provided with electrodes for detecting a position where an object contacts or proximities the display surface, and the first piezoelectric element layer is located between the touch panel upper side electrode layer and the touch panel lower side electrode layer.

Advantageous Effects of Invention

According to a touch panel according to an aspect of the present invention, there is an advantage that further miniaturization and performance improvement can be achieved in the pressure detection type touch panel.

Figure 1:
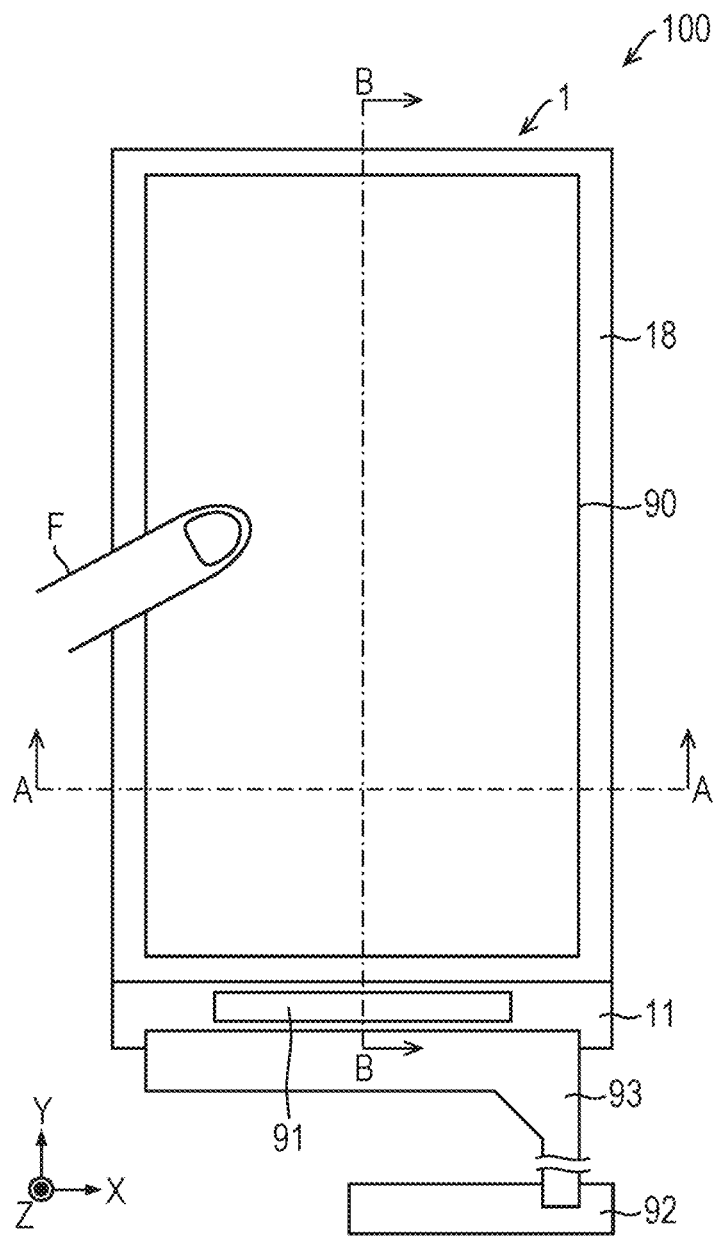
FIG. 1 is a view showing a schematic configuration of a display device provided with a touch panel according to a first embodiment.
Figure 2:
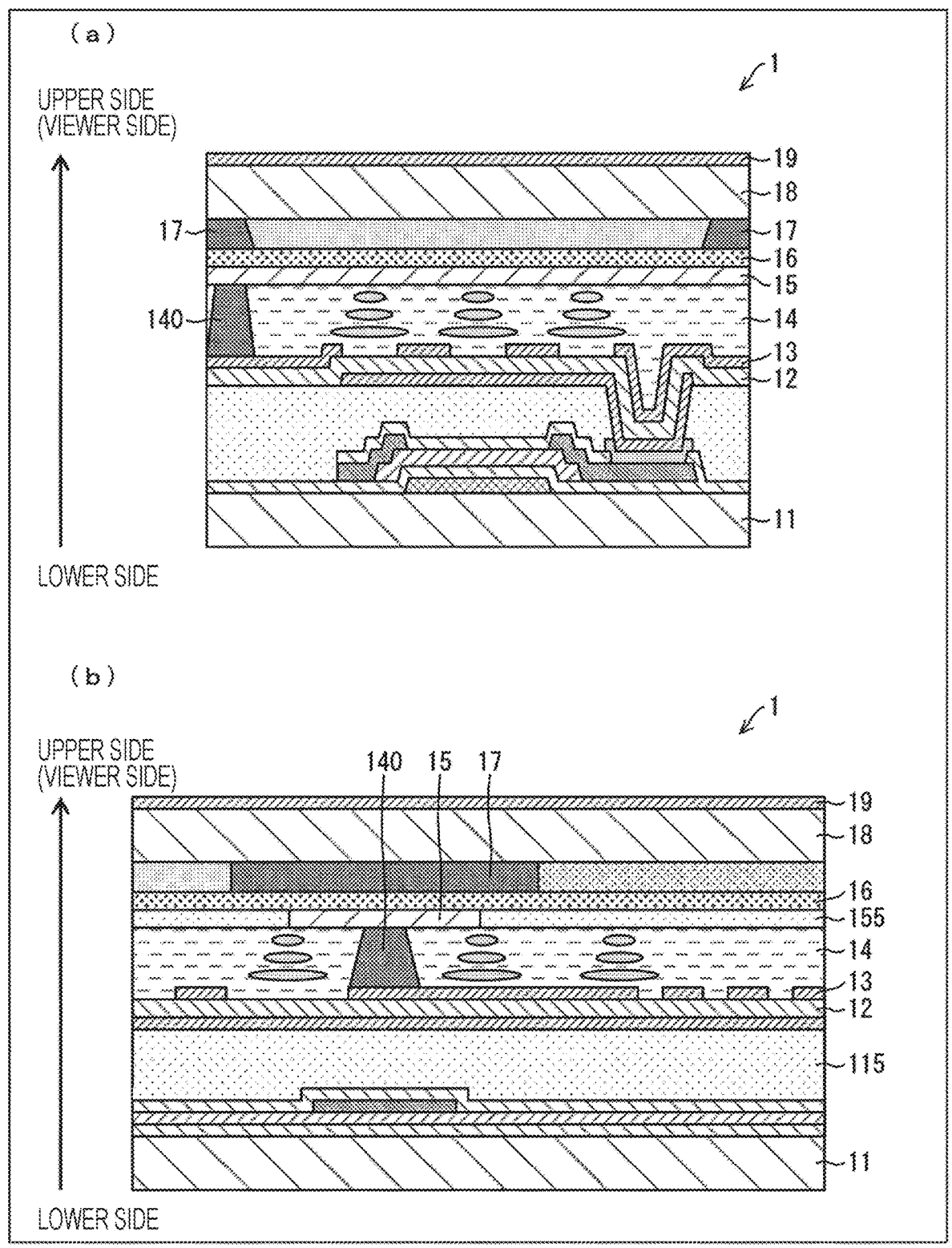

(a) of FIG. 2 is a cross-sectional view viewed from a direction of arrows A-A of FIG. 1, and (b) of FIG. 2 is cross-sectional view viewed from a direction of arrows B-B of FIG. 1.

Figure 3:
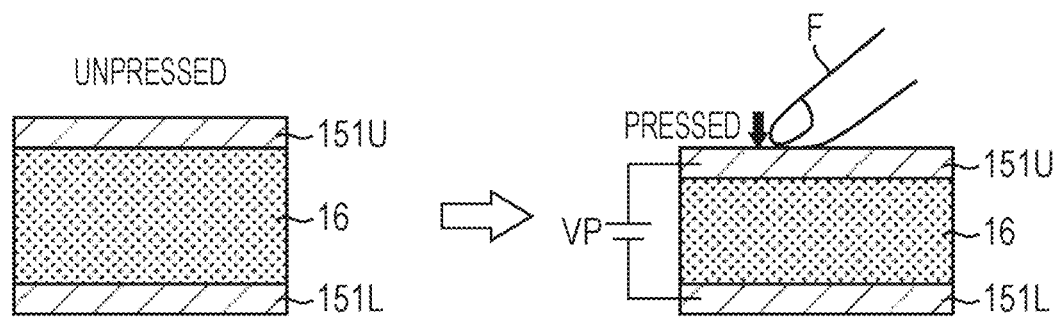

FIG. 3 is a view for explaining the function of a piezoelectric element layer.

Figure 4:
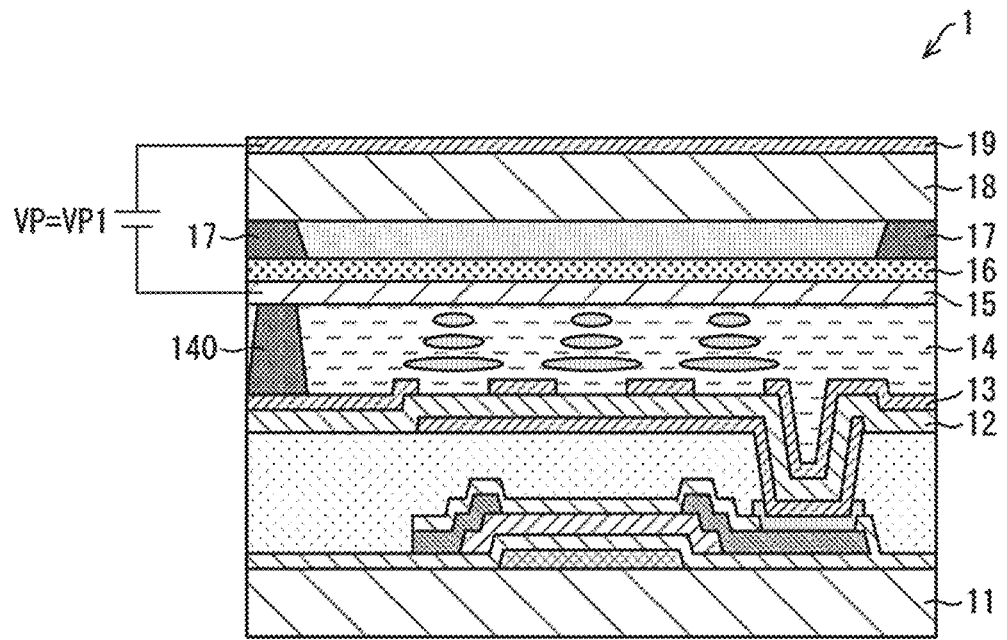

FIG. 4 is a view for explaining a pressure detection voltage obtained in the touch panel of FIG. 1.

Figure 5:
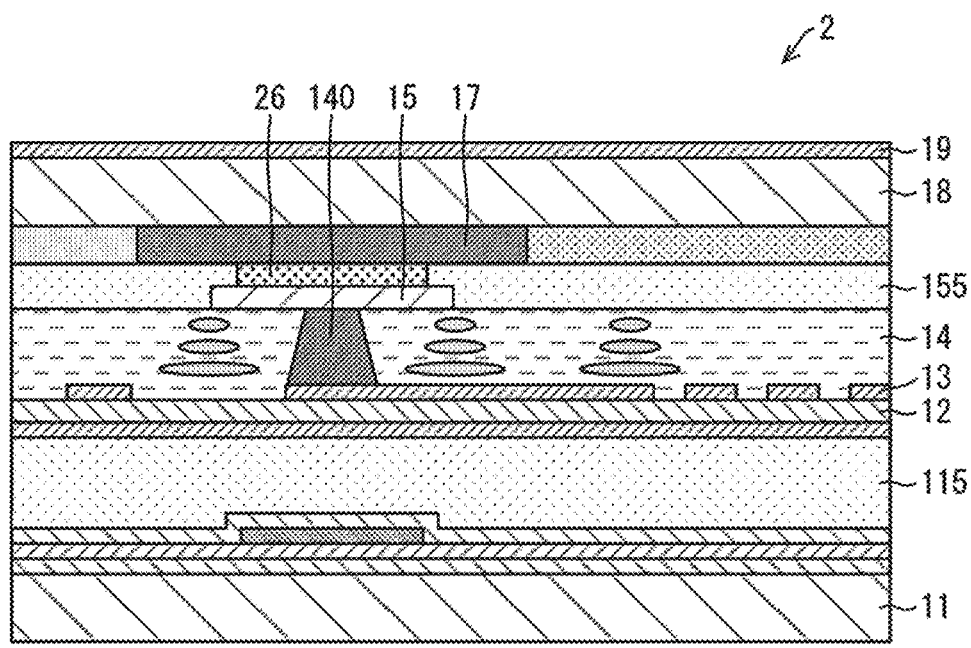

FIG. 5 is a cross-sectional view showing a configuration of a touch panel according to a second embodiment.

Figure 6:
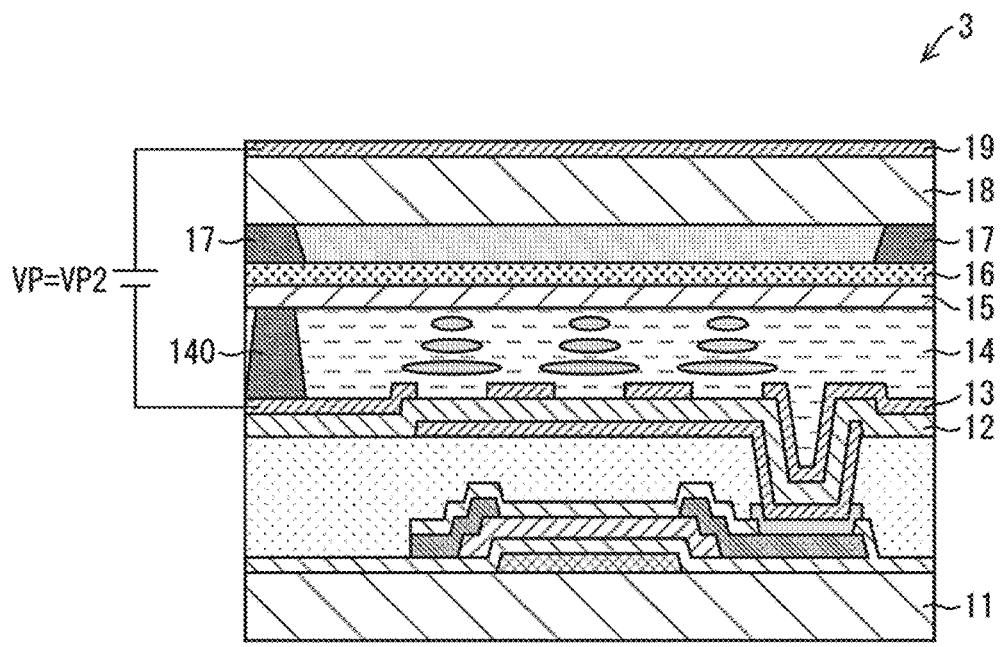

FIG. 6 is a cross-sectional view showing a configuration of a touch panel according to a third embodiment.

Figure 7:
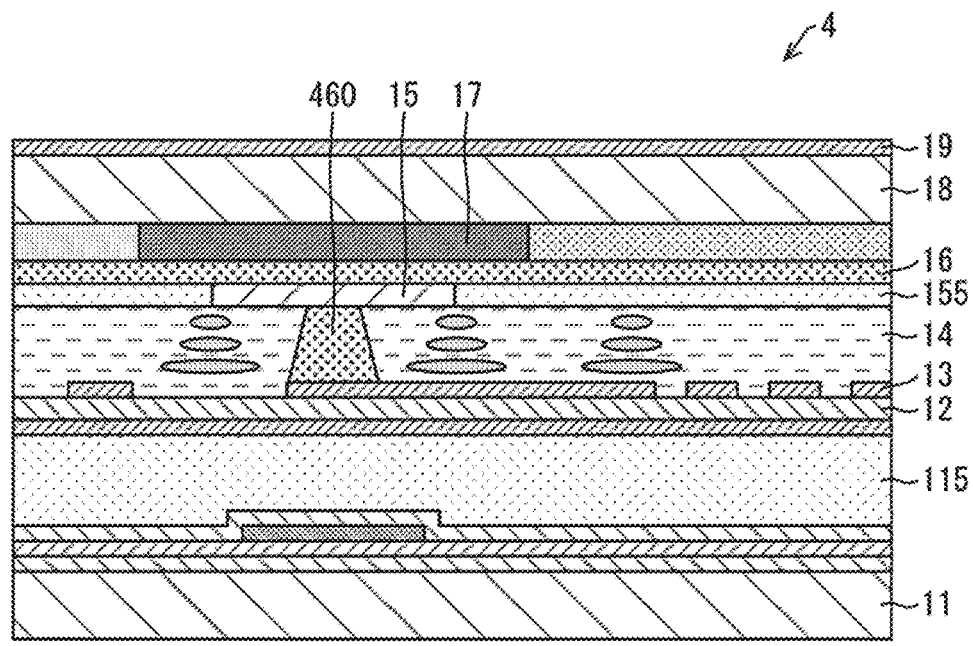

FIG. 7 is a cross-sectional view showing a configuration of a touch panel according to a fourth embodiment.

Figure 8:
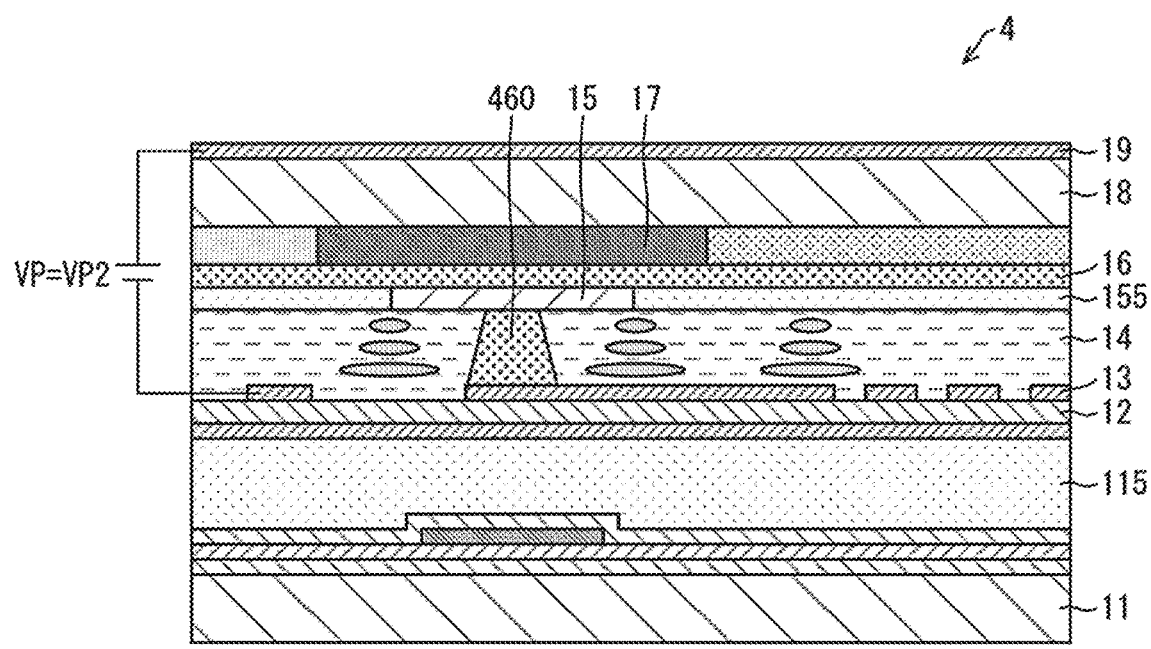

FIG. 8 is a view for explaining a pressure detection voltage obtained in the touch panel according to the fourth embodiment.

DESCRIPTION OF EMBODIMENTS

First Embodiment

Hereinafter, the first embodiment will be described in detail with reference to FIGS. 1 to 4. FIG. 1 is a view showing a schematic configuration of a display device 100 (electronic device) provided with a touch panel 1 according to the first embodiment. First, an overview of the display device 100 will be described with reference to FIG. 1. The display device 100 is an example of an electronic device provided with a touch panel according to one embodiment of the present invention.

However, the electronic device provided with the touch panel (example: touch panel 1) according to one embodiment of the present invention is not limited to the display device. The electronic device may be a portable terminal such as a smartphone or a tablet, for example. Alternatively, the electronic device may be an information processing device such as a PC monitor, signage, an electronic blackboard, or an information display.

In addition, although various members of the touch panel 1 are shown in the drawings (in particular, FIG. 2 and the like) to be described below, descriptions of the members not related to the first embodiment will be omitted. It may be understood that these members with descriptions omitted are similar to well-known ones. It is to be noted that drawings are intended to provide an overview of the shape, structure, and positional relationship of members, and are not always drawn to scale.

(Overview of Display Device 100)

As shown in FIG. 1, the display device 100 includes a touch panel 1, a display unit 90 (display surface), a driver 91, a control substrate 92, and a flexible printed circuit substrate (FPC) 93. In addition, the touch panel 1 includes a thin film transistor (TFT) substrate 11, a color filter (CF) substrate 18, and a display unit 90 (see also FIG. 2 and the like described below).

The display unit 90 may be a liquid crystal (LC) panel, for example. The display unit 90 displays various images. Since the display device 100 is provided with the touch panel 1, the display unit 90 also serves as an input unit (input surface) that receives an input operation of the user (for example, a touch input by the finger F of the user). The display unit 90 may be referred to as an active area.

The driver 91 serves as a display control unit that controls the display unit 90. For example, the driver 91 may apply an instruction to the TFT substrate 11 and control lighting of the pixels (not shown) formed on the TFT substrate 11.

The control substrate 92 is a substrate provided with a main control unit that collectively controls the operation of the display device 100. A touch panel controller (not shown) that controls the operation of the touch panel 1 may be provided on the control substrate 92. Alternatively, the main control unit described above may have the function of the touch panel controller.

The FPC 93 is a member that connects the control substrate 92 and the driver 91. The FPC 93 has high flexibility and may be highly deformable. Therefore, the FPC 93 is suitable for manufacturing a small or thin electronic device (for example, a portable terminal).

In FIG. 1, a direction parallel to the short side of the display device 100 (in other words, the short side of the display unit 90) is referred to as the X direction. In addition, a direction parallel to the long side of the display device 100 (long side of the display unit 90) is referred to as the Y direction. In FIG. 1, the X direction and the Y direction are orthogonal to each other.

Further, in FIG. 1, a direction perpendicular to the paper surface (that is, a direction perpendicular to the X direction and the Y direction) is referred to as the Z direction. It is assumed that a direction from the TFT substrate 11 toward the display unit 90 (that is, the side of the user (viewer) who views the image displayed on the display unit 90) is a positive direction in the Z direction. Hereinafter, the positive direction in the Z direction is also referred to as the upper direction. The upper direction may also be defined as a direction from the TFT substrate 11 toward the CF substrate 18 in FIG. 2 described below.

Meanwhile, the negative direction in the Z direction (a direction opposite to the upper direction) is also referred to as the lower direction. Hereinafter, for convenience of description, the Z direction is also referred to as the vertical direction. Further, the upper side in the vertical direction is also referred to as a viewer side.

(Touch Panel 1)

Subsequently, the touch panel 1 will be described with reference to FIG. 2. FIG. 2 is a cross-sectional view showing the configuration of the touch panel 1. Specifically, in (a) of FIG. 2 is a cross-sectional view viewed from a direction of arrows A-A of FIG. 1, and FIG. (b) is a cross-sectional view viewed from a direction of arrows B-B of FIG. 1. That is, in (a) of FIG. 2 is a cross-sectional view in the XZ plane of FIG. 1, and FIG. (b) is a cross-sectional view in the YZ plane of FIG. 1.

In the touch panel 1, an electrode layer (a TP lower side electrode layer 15 and a TP upper side electrode layer 19) for realizing an input position detection function is formed on a lower side (inner) than the display unit 90 when viewed from the upper side (viewer side). From this, the touch panel 1 is also referred to as an in-cell type touch panel.

As shown in (a) of FIG. 2, the touch panel 1 includes, from the lower side toward the upper side (that is, in order from a side farthest from the display unit 90), a TFT substrate 11 (pixel substrate), an insulating layer 12, and an indium tin oxide (ITO) layer 13, a liquid crystal layer 14, a TP lower side electrode layer 15 (touch panel lower side electrode layer), a piezoelectric element layer 16 (first piezoelectric element layer), a black matrix (BM) 17, a CF substrate 18 (color filter layer), and a TP upper side electrode layer 19 (touch panel upper side electrode layer) in this order. In addition, on the upper side of the TP upper side electrode layer 19, a display unit 90 (not shown except for FIG. 1) is further provided.

In the inside of the liquid crystal layer 14, a photo spacer (PS) 140 is provided. The PS 140 is a member (spacer) for maintaining a uniform thickness (length in the Z direction) of the liquid crystal layer 14. The PS 140 may be formed in a columnar shape.

As shown in (b) of FIG. 2, in the touch panel 1, a planarization layer 115 may be provided above the TFT substrate 11 and below the insulating layer 12. In addition, the planarization layer 155 may be provided on a portion of an upper surface of the liquid crystal layer 14.

On the TFT substrate 11, (i) a plurality of pixels of red, green, blue (RGB) (that is, pixels forming an image displayed on the display unit 90), and (ii) TFTs corresponding to the respective pixels are spatially regularly arranged. The TFT serves as a switching element that controls the lighting of the pixels. The light emitted from each pixel is directed upward. In FIG. 2 and the like, the pixels and the TFTs are not illustrated for simplification.

In the ITO layer 13 (conductive layer), a pixel electrode (not shown) for driving the pixels in the TFT substrate 11 is formed. The ITO layer 13 is a transparent layer because ITO is a material that is particularly excellent in light transmitting. Therefore, the ITO layer 13 does not hinder the viewability of the user who views the image displayed on the display unit 90. The insulating layer 12 is provided to protect various wirings of the TFT substrate 11 and the ITO layer 13.

The liquid crystal layer 14 contains a liquid crystal material of which coordination is changed according to the voltage applied to the liquid crystal layer 14. Therefore, the light transmitting of the liquid crystal layer 14 may be adjusted according to the voltage applied to the liquid crystal layer 14.

The TP lower side electrode layer 15 is a layer, within which one of a drive electrode (also referred to as a drive line) or a sense electrode (also referred to as a sense line) is formed. The first embodiment exemplifies the case in which the TP lower side electrode layer 15 is a drive electrode layer within which a drive electrode is formed. The TP lower side electrode layer 15 is formed on the upper surface of the liquid crystal layer 14. That is, the TP lower side electrode layer 15 is located below the CF substrate 18. In FIG. 2 and the like, the drive electrodes and the sense electrodes are not illustrated for simplification.

The material of the drive electrode (in other words, the material of the TP lower side electrode layer 15) is not particularly limited. The first embodiment exemplifies a case in which the material of the drive electrode is Cu (copper). In addition, since Cu is a non-transparent material, it is desirable that the drive electrode be formed so as not to hinder the viewability of the user. For example, the drive electrode may be formed in a metal mesh shape. Alternatively, a transparent conductive material (for example, ITO) may be used for the drive electrode from the viewpoint of improving the viewability of the user.

The piezoelectric element layer 16 is a layer formed of a piezoelectric material. The piezoelectric element layer 16 serves as a piezoelectric element (also referred to as a piezo element). The piezoelectric element layer 16 is formed on an upper surface of the TP lower side electrode layer 15. The piezoelectric element layer 16 will be described in more detail below. Note that, for the sake of distinguishing from the second piezoelectric element layer 460 described in the fourth embodiment to be described below, the piezoelectric element layer 16 is also referred to as a first piezoelectric element layer.

The BM 17 (light shielding member) is a light shielding member disposed so as to surround the neighbor of each pixel described above when viewed from the upper direction. The outline of each pixel is emphasized by partitioning each pixel with the BM 17. Therefore, the contrast of the image displayed on the display unit 90 is improved.

The CF substrate 18 is a substrate provided with a color filter that transmits light in a certain wavelength range. For example, the CF substrate 18 may include three types of color filters: (i) a first color filter that transmits red (R) light, (ii) a second color filter that transmits green (G) light, and (iii) a third color filter that transmits blue (B) light. On the CF substrate 18, a plurality of color filters are spatially regularly arranged. In FIG. 2 and the like, the corresponding color filter is not illustrated for the simplification of drawing.

The TP upper side electrode layer 19 is a layer having one of the drive electrode or the sense electrode formed therewithin, which is a different type of electrode from the electrode (for example, the drive electrode) formed on the TP lower side electrode layer 15. The first embodiment exemplifies the case in which the TP upper side electrode layer 19 is the sense electrode layer within which a sense electrode is formed. The TP upper side electrode layer 19 is formed on an upper surface of the CF substrate 18.

The material of the sense electrode (in other words, the material of the TP upper side electrode layer 19) is not particularly limited, as in the case of the material of the drive electrode described above. The first embodiment exemplifies the case in which the material of the sense electrode is ITO. Alternatively, a non-transparent material (for example, Cu) may also be used as the material of the sense electrode.

The drive electrode and the sense electrode are electrodes for detecting a position where an object (for example, the finger F in FIG. 1 described above) contacts or proximities the display unit 90. In the first embodiment, a plurality of drive electrodes are arranged along the X direction, for example. In addition, a plurality of sense electrodes are arranged along the Y direction, for example.

The touch panel 1 may detect a value (signal value) of the capacitance formed at the intersection of each of the plurality of drive electrodes and each of the plurality of sense electrodes. Then, based on the signal value, the touch panel 1 may detect (i) contact or proximity of an object to the display unit 90, and (ii) a position on the display unit 90 where the contact or proximity occurs. That is, the touch panel 1 may be a capacitive touch panel.

The TP lower side electrode layer 15 and the TP upper side electrode layer 19 (in other words, the drive electrode and the sense electrode) are connected to the touch panel controller described above with wirings (not shown). The drive electrode and the sense electrode are each driven by a touch panel controller. The operation of the touch panel controller for performing the detection of the signal value and the detection of the input position is well-known and thus the description thereof is not repeated.

As described above, the touch panel 1 is provided with the TP upper side electrode layer 19 and the TP lower side electrode layer 15, so that the position on the display unit 90 where the touch input is performed with the finger F, for example, may be detected.

As described above, the first embodiment exemplifies the case in which the TP lower side electrode layer 15 is the drive electrode layer and the TP upper side electrode layer 19 is the sense electrode layer. Alternatively, the TP lower side electrode layer 15 may be provided as the sense electrode layer, and the TP upper side electrode layer 19 may be provided as the drive electrode layer.

(Function of Piezoelectric Element Layer 16)

FIG. 3 is a diagram for explaining the function of the piezoelectric element layer 16 (piezoelectric element). As shown in FIG. 3, it is assumed that the upper side electrode layer 151U is provided on an upper surface of the piezoelectric element layer 16 and the lower side electrode layer 151L is provided on a lower surface of the piezoelectric element layer 16. The upper side electrode layer 151U and the lower side electrode layer 151L are layers in which electrodes are formed for detecting a voltage generated in the piezoelectric element layer 16 (that is, a potential difference between the upper side electrode layer 151U and the lower side electrode layer 151L).

The piezoelectric element is an element that generates polarization charge on the surface in accordance with pressure (distortion) when the pressure is applied to the element itself (more strictly speaking, when distortion is generated in the element itself). That is, the piezoelectric element generates a potential difference (voltage) in accordance with the pressure between a pressing surface and a surface opposed to the pressing surface. More specifically, as the pressure applied to the piezoelectric element increases, the voltage generated in the piezoelectric element also increases.

As an example, as shown with the legend "unpressed" in FIG. 3, when the upper side electrode layer 151U is not pressed, the piezoelectric element layer 16 is not pressed as well. Therefore, the piezoelectric element layer 16 does not generate a voltage.

Meanwhile, as shown with the legend "pressed" in FIG. 3, when the upper side electrode layer 151U is pressed by the finger F of the user, for example, the piezoelectric element layer 16 is also pressed. Therefore, the piezoelectric element layer 16 generates a voltage.

Hereinafter, in the touch panel 1, a voltage for detecting a pressing on the display unit 90 is referred to as a voltage VP. The voltage VP may be referred to as a pressure detection voltage. In the configuration of FIG. 3, when the piezoelectric element layer 16 is pressed, the voltage generated in the piezoelectric element layer 16 may be acquired as a voltage VP (the pressure detection voltage).

FIG. 4 is a view for explaining the voltage VP (the pressure detection voltage) obtained in the touch panel 1. As described above, in the touch panel 1, the piezoelectric element layer 16 is located between the TP upper side electrode layer 19 and the TP lower side electrode layer 15. Therefore, in the touch panel 1, the TP upper side electrode layer 19 may play a role of the upper side electrode layer 151U, and the TP lower side electrode layer 15 may play a role of the lower side electrode layer 151L, respectively.

That is, in the touch panel 1, the potential difference between the TP upper side electrode layer 19 and the TP lower side electrode layer 15 may be acquired as the voltage VP (press detection voltage) described above. Note that, for the sake of distinguishing from the voltage VP in FIG. 3, the voltage VP in FIG. 4 (the potential difference between the TP upper side electrode layer 19 and the TP lower side electrode layer 15) is also referred to as a voltage VP1. In the touch panel 1, a voltage is generated in the piezoelectric element layer 16 by the piezoelectric element layer 16 being pressed in accordance with the pressing of the display unit 90.

As described above, in the touch panel 1, the TP upper side electrode layer 19 and the TP lower side electrode layer 15 are each connected to the touch panel controller by wirings (not shown). The touch panel controller performs a processing (pressure detection processing) of detecting whether or not the display unit 90 is pressed based on the voltage VP1 acquired through the wirings. Since the pressure detection processing is well-known, the description is skipped.

Note that the material of the piezoelectric element layer 16 is not particularly limited. For example, as a material of the piezoelectric element layer 16, polyvinylidene fluoride (PVDF), Poly L-LActide-acid (PLLA), and the like may be used.

Meanwhile, since the piezoelectric element layer 16 is a member provided on the touch panel 1 (in-cell type touch panel) including the display unit 90, it is desirable that it does not hinder the viewability of the user. Therefore, for a material of the piezoelectric element layer 16, for example, it is desirable to select a material excellent in light transmitting.

Further, in consideration of the color of members in a neighbor of the piezoelectric element layer 16 in the touch panel 1, it is desirable to select a material having a color close to that of the members in the neighbor as the material of the piezoelectric element layer 16.

In addition, as the material of the piezoelectric element layer 16, it is desirable to select a material which does not cause the phase difference (retardation) of light as much as possible so that the phase of light emitted from the upper surface of the piezoelectric element layer 16 does not greatly differ from the phase of light incident on the lower surface of the piezoelectric element layer 16.

From the viewpoint of further reducing the phase difference of light, a phase difference film may be provided above the piezoelectric element layer 16. This is because even when a phase difference of light occurs in the piezoelectric element layer 16, the phase difference film may compensate (lessen) the phase difference.

(Effect of Touch Panel 1)

As described above, in the touch panel 1, the input position detection function of the touch panel 1 is realized with the TP upper side electrode layer 19 and the TP lower side electrode layer 15. In addition, the TP upper side electrode layer 19 and the TP lower side electrode layer 15 are provided so as to sandwich the piezoelectric element layer 16 therebetween.

Therefore, as shown in FIG. 4 described above, the TP upper side electrode layer 19 and the TP lower side electrode layer 15 may be used as the electrode layers (electrodes) for acquiring the voltage VP1 (pressure detection voltage). Therefore, the pressure detection function of the touch panel 1 is realized by the piezoelectric element layer 16 located between the TP upper side electrode layer 19 and the TP lower side electrode layer 15.

As described above, according to the touch panel 1, a pressure detection type touch panel (a touch panel having both input position detection function and pressure detection function) can be configured without requiring the second pressure sensor electrode layer that was present in the touch panel of PTL 1 described above. The main advantages of the touch panel 1 obtained by this configuration are (1) and (2) below.

(1): In the touch panel of PTL 1, since a separate substrate and an adhesive layer are employed to provide the second pressure sensor electrode layer, the thickness of the touch panel is increased. On the other hand, according to the configuration of the touch panel 1, since the second pressure sensor electrode layer is not present, the substrate and adhesive layer described above may not be employed.

As described above, in the touch panel 1, compared to the touch panel disclosed in PTL 1, an increase in the thickness of the touch panel may be suppressed, so that it is possible to realize further miniaturization of the touch panel.

(2): In the touch panel 1, the second pressure sensor electrode layer is not present. For this reason, there is no capacitive coupling (capacitive coupling unintended in design, which is present in the touch panel of PTL 1) caused by the second pressure sensor electrode layer.

Therefore, compared with the touch panel of PTL 1, the touch panel 1 can suppress unintended capacitive coupling in design. Therefore, an increase in noise of the touch panel due to the capacitive coupling can be suppressed, so that it possible to further improve the performance of the touch panel (for example, the performance of at least one of the position detection function and the pressure detection function).

As described above, according to the touch panel 1, it is possible to realize further miniaturization and performance improvement in the pressure detection type touch panel (a touch panel having both the input position detection function and the pressure detection function).

(Supplemental Note)

As shown in FIG. 4 described above, according to the arrangement of the piezoelectric element layer 16 in the touch panel 1, the voltage VP1 (pressure detection voltage) may be acquired using the TP upper side electrode layer 19 and the TP lower side electrode layer 15.

For this reason, in the touch panel 1, an additional electrode layer (for example, an additional lower side electrode layer) for detecting the pressure detection voltage may not be employed. Therefore, according to the touch panel 1, the advantage is also acquired that the manufacturing process of the touch panel 1 can be simplified.

MODIFICATION EXAMPLE

In the first embodiment, for convenience of explanation, the configuration in which the TP upper side electrode layer 19 is located on the upper surface of the CF substrate 18 has been exemplified. It is to be noted that the TP upper side electrode layer 19 does not need to be in direct contact with the upper surface of the CF substrate 18, and may be in indirect contact with the upper surface of the CF substrate 18 through a certain member (for example, an additional layer). The TP upper side electrode layer 19 may be disposed above the CF substrate 18.

Further, in the first embodiment, the configuration in which the TP lower side electrode layer 15 is located on the upper surface of the liquid crystal layer 14 has been exemplified. Alternatively, the TP lower side electrode layer 15 also does not need to be in direct contact with the upper surface of the liquid crystal layer 14, and may be in indirect contact with the upper surface of the liquid crystal layer 14 through a certain member (for example, additional layer). The TP lower side electrode layer 15 may be located below the CF substrate 18 and above the liquid crystal layer 14.

The same applies to each of the members except the TP upper side electrode layer 19 and the TP lower side electrode layer 15.

Second Embodiment

Hereinafter, the second embodiment will be described with reference to FIG. 5. It is to be noted that, for convenience of explanation, parts having the same function as the parts described in the embodiment described above are denoted by the same reference numerals, and description thereof will not be repeated.

FIG. 5 is a cross-sectional view showing the configuration of the touch panel 2 according to the second embodiment. Specifically, FIG. 5 shows a cross-sectional view viewed from a direction of arrows B-B in FIG. 1 described above. In the following embodiments, for convenience of explanation, the cross-sectional view viewed from a direction of arrows A-A of FIG. 1 will be skipped.

The touch panel 2 has a configuration in which the piezoelectric element layer 16 in the touch panel 1 of the first embodiment is replaced with a piezoelectric element layer 26 (first piezoelectric element layer). The piezoelectric element layer 26 is the same as the piezoelectric element layer 16 of the first embodiment in that it is disposed so as to be sandwiched between the TP upper side electrode layer 19 and the TP lower side electrode layer 15.

Alternatively, the piezoelectric element layer 26 is disposed so as to be covered by a lower surface of the BM 17. That is, when viewed from the upper side, the piezoelectric element layer 26 is provided so as to be blocked by the BM 17 and not visually recognized by the user. In other words, when viewed in the Z direction (the normal line direction of the piezoelectric element layer 26), the piezoelectric element layer 26 is disposed so as to overlap the BM 17 as much as possible. Regarding this point, the piezoelectric element layer 26 is different from the piezoelectric element layer 16.

As an example, the piezoelectric element layer 26 may be formed by patterning only a portion of the lower surface of the BM 17. Note that the thickness of the piezoelectric element layer 26 may be equal to the thickness of the TP lower side electrode layer 15 or may be different from the thickness of the TP lower side electrode layer 15. The piezoelectric element layer 26 may be formed thicker than the TP lower side electrode layer 15 or may be formed thinner than the TP lower side electrode layer 15.

According to the arrangement of the piezoelectric element layer 26, when viewed from the upper side, the piezoelectric element layer 26 may be covered and hidden by the BM 17.

Therefore, it is possible to prevent the viewability of the user from being hindered by the piezoelectric element layer 26. That is, according to the touch panel 2, compared with the touch panel 1, it is possible to further improve the viewability of the user.

Third Embodiment

Hereinafter, the third embodiment will be described with reference to FIG. 6. FIG. 6 is a view for explaining a voltage VP (pressure detection voltage) obtained in the touch panel 3 of the third embodiment. Each member provided in the touch panel 3 is the same as that provided in the touch panel 1 of the first embodiment.

As shown in FIG. 6, in the touch panel 3, a potential difference between the TP upper side electrode layer 19 and the ITO layer 13 is acquired as the voltage VP. That is, in the touch panel 3, instead of the TP lower side electrode layer 15, the ITO layer 13 plays a role of the lower side electrode layer 151L (see FIG. 3 described above). For this point, the touch panel 3 is different from the touch panel 1.

Hereinafter, for the sake of distinguishing from the voltage VP1 in the first embodiment, the voltage VP (the potential difference between the TP upper side electrode layer 19 and the ITO layer 13) in FIG. 6 is also referred to as a voltage VP2. The ITO layer 13 is a conductive layer located further below the TP lower side electrode layer 15. Therefore, the TP upper side electrode layer 19 and the ITO layer 13 are also located to sandwich the piezoelectric element layer 16 therebetween. Therefore, the voltage VP2 may also be acquired as the pressure detection voltage.

Fourth Embodiment

Hereinafter, the fourth embodiment will be described with reference to FIGS. 7 and 8. FIG. 7 is a cross-sectional view showing the configuration of the touch panel 4 according to the fourth embodiment. Specifically, FIG. 7 shows a cross-sectional view viewed from a direction of arrows B-B in FIG. 1 described above. The cross-sectional view viewed from a direction of arrows A-A will be skipped because it is the same as FIG. 1.

As shown in FIG. 7, the touch panel 4 has a configuration in which the PS 140 in the touch panel 1 according to the first embodiment is replaced with the second piezoelectric element layer 460. That is, the touch panel 4 further includes the second piezoelectric element layer 460 (additional piezoelectric element layer) in addition to the piezoelectric element layer 16 (first piezoelectric element layer).

The second piezoelectric element layer 460 is the same as the piezoelectric element layers 16 and 26 in the first to third embodiments in view of the function of the piezoelectric element itself. In the touch panel 4, in addition to the piezoelectric element layer 16, the second piezoelectric element layer 460 is also pressed in accordance with the pressing on the display unit 90. Therefore, a voltage in accordance with the pressure applied thereto is also generated in the second piezoelectric element layer 460.

In addition, the second piezoelectric element layer 460 also has a function as PS 140 (function as a spacer). The second piezoelectric element layer 460 is formed in the same size and shape (columnar shape) as the PS 140. In the case of FIG. 7, the second piezoelectric element layer 460 provided within the liquid crystal layer 14 is formed sufficiently thicker than the piezoelectric element layer 16 in order to maintain a uniform thickness of the liquid crystal layer 14.

The second piezoelectric element layer 460 serves as a spacer, so that relatively large pressure is applied to the upper surface of the second piezoelectric element layer 460 when the display unit 90 is pressed. Therefore, when the display unit 90 is pressed, a voltage may also be generated in the second piezoelectric element layer 460.

Further, the second piezoelectric element layer 460 serves as a spacer, so that an increase in the thickness of the touch panel 4 can be suppressed even when the second piezoelectric element layer 460 is provided. Therefore, the configuration of the second piezoelectric element layer 460 is also desirable from the viewpoint of miniaturization of the touch panel 4. In addition, since PS 140 may not be employed, even when the second piezoelectric element layer 460 is provided, an increase in the number of parts of the touch panel 4 can be suppressed.

As shown in FIG. 7, the second piezoelectric element layer 460 is provided at the same position as the PS 140. That is, like the piezoelectric element layer 26 of the second embodiment, the second piezoelectric element layer 460 is also disposed so as to be covered by the lower surface of the BM 17. As described above, the second piezoelectric element layer 460 is also disposed so as to overlap the BM 17 when viewed in the Z direction (the normal line direction of the second piezoelectric element layer 460).

By arranging the second piezoelectric element layer 460 in this manner, when viewed from the upper side, the second piezoelectric element layer 460 is, like the piezoelectric element layer 26, also shielded by the BM 17 and not visually recognized by the user. Therefore, even when the second piezoelectric element layer 460 is provided, the viewability of the user can be enhanced as in the touch panel 2. Further, in the touch panel 4, the piezoelectric element layer 16 is replaced with the piezoelectric element layer 26, so that the viewability of the user can be particularly effectively enhanced.

FIG. 8 is a diagram for explaining the pressure detection voltage obtained in the touch panel 4. As shown in FIG. 8, as in the touch panel 3 of the third embodiment, the voltage VP2 (the potential difference between the TP upper side electrode layer 19 and the ITO layer 13) is also detected as the pressure detection voltage in the touch panel 4.

As described above, when the display unit 90 is pressed, a voltage (pressure detection voltage) is generated in each of the piezoelectric element layer 16 and the second piezoelectric element layer 460. In this example, the voltage generated in the piezoelectric element layer 16 (first piezoelectric element layer) is referred to as a first pressure detection voltage, and the voltage generated in the second piezoelectric element layer 460 is referred to as a second pressure detection voltage, respectively.

According to the configuration of the touch panel 4, the TP upper side electrode layer 19 and the ITO layer 13 are located so as to sandwich the piezoelectric element layer 16 and the second piezoelectric element layer 460 therebetween. Therefore, the sum of the first pressure detection voltage and the second pressure detection voltage may be acquired as the voltage VP2.

That is, compared to the touch panel 3, a larger voltage VP2 (pressure detection voltage) can be obtained. Therefore, it is possible to increase the accuracy of pressure detection. As described above, providing the second piezoelectric element layer 460 is desirable also from the viewpoint of the performance improvement of the touch panel (more specifically, the improvement of the pressure detection performance).

CONCLUSION

The touch panel 1 according to a first aspect of the present invention is a touch panel including a display surface (display unit 90), which further includes a touch panel upper side electrode layer (TP upper side electrode layer 19) including a pixel substrate (TFT substrate 11), a liquid crystal layer (14), and a color filter layer (CF substrate 18) in order from a side farthest from the display surface, and being located above the color filter layer, with a direction from the pixel substrate toward the color filter layer being an upper direction and a direction opposite to the upper direction being a lower direction, a touch panel lower side electrode layer located below the color filter layer and above the liquid crystal layer (TP lower side electrode layer 15), and a first piezoelectric element layer (piezoelectric element layer 16) that generates a voltage in accordance with a pressing on the display surface, in which the touch panel upper side electrode layer and the touch panel lower side electrode layer are provided with electrodes for detecting a position where an object contacts or proximities the display surface, and the first piezoelectric element layer is located between the touch panel upper side electrode layer and the touch panel lower side electrode layer.

With this configuration, the input position detection function of the touch panel can be realized by the touch panel upper side electrode layer and the touch panel lower side electrode layer. In addition, the pressure detection function of the touch panel can be realized by the first piezoelectric element layer located between the touch panel upper side electrode layer and the touch panel lower side electrode layer.

Therefore, a pressure detection type touch panel (a touch panel having both input position detection function and pressure detection function) can be configured without employing the second pressure sensor electrode layer that was present in the touch panel of PTL 1 described above.

As a result, as described above, (i) the increase in the thickness of the touch panel due to the presence of the second pressure sensor electrode layer, and (ii) the increase in noise due to the presence of the second pressure sensor electrode layer can both be suppressed. Therefore, it is possible to implement further miniaturization and performance improvement in the pressure detection type touch panel.

In the touch panel according to a second aspect of the present invention, it is desirable that, in the first aspect described above, a light shielding member 17 located above the first piezoelectric element layer is further included, in which the first piezoelectric element layer 26 is disposed at a position covered by the light shielding member when viewed from the upper side.

With this configuration, when viewed from the upper side (for example, when the user views an image displayed on the display surface), the first piezoelectric element layer can be covered and hidden by the shielding member. Therefore, it is possible to improve the viewability of the user.

In the touch panel according to a third aspect of the present invention, it is desirable that, in the first or second aspect described above, a second piezoelectric element layer 460 is further included, which generates a voltage in accordance with the pressure on the display surface, in which the second piezoelectric element layer is provided within the liquid crystal layer and serves as a spacer for maintaining a thickness of the liquid crystal layer.

With this configuration, by further providing the second piezoelectric element layer (additional piezoelectric element layer), as described below, a higher voltage can be acquired as a voltage (the pressure detection voltage described above) for detecting a pressing on the display surface. Therefore, it is possible to enhance the accuracy of detection (press detection) as to whether or not the display surface is pressed. Therefore, the configuration is also desirable from the viewpoint of performance improvement of a touch panel.

Further, by providing the second piezoelectric element layer with the function of the spacer, an increase in the thickness of the touch panel can be suppressed even when the second piezoelectric element layer is provided. Therefore, the configuration is also desirable from the viewpoint of miniaturization of the touch panel.

In the touch panel according to a fourth aspect of the present invention, it is desirable that, in the third aspect described above, a light shielding member located above the first piezoelectric element layer is further included, in which the second piezoelectric element layer is disposed at a position covered by the light shielding member when viewed from the upper side.

With this configuration, the second piezoelectric element layer can be covered and hidden by the shielding member when viewed from the upper side. Therefore, even when the second piezoelectric element layer is further provided, the viewability of the user can be improved.

In the touch panel according to a fifth aspect of the present invention, in any one of the first to fourth aspects described above, the potential difference (voltage VP1) between the touch panel upper side electrode layer and the touch panel lower side electrode layer may be acquired as a voltage for detecting the pressing on the display surface.

As described above, in the touch panel according to an aspect of the present invention, the touch panel upper side electrode layer and the touch panel lower side electrode layer are provided to sandwich the first piezoelectric element layer therebetween. Therefore, as in the above configuration, the touch upper lower side electrode layer and the touch panel lower side electrode layer may be used as two electrode layers (electrodes) for acquiring a voltage (potential difference generated between the upper surface and the lower surface of the first piezoelectric element layer) generated in the first piezoelectric element layer in accordance with the pressing on the display surface.

In the touch panel according to a sixth aspect of the present invention, in the first or second aspect described above, a conductive layer (ITO layer 13) located below the liquid crystal layer is further included, and the potential difference (voltage VP2) between the touch panel upper side electrode layer and the conductive layer may be acquired as a voltage for detecting a pressing on the display surface.

With this configuration, the first piezoelectric element layer can be sandwiched by the touch panel upper side electrode layer and the conductive layer. Therefore, as in the above configuration, the touch panel upper side electrode layer and the conductive layer may also be used as two electrode layers for acquiring a voltage generated in the first piezoelectric element layer in accordance with the pressing on the display surface.

In the touch panel according to a seventh aspect of the present invention, in the third or fourth aspect described above, a conductive layer located below the liquid crystal layer is further included, and the potential difference between the touch panel upper side electrode layer and the conductive layer may be acquired as a voltage for detecting a pressing on the display surface.

With this configuration, both the first piezoelectric element layer and the second piezoelectric element layer can be sandwiched by the touch panel upper side electrode layer and the conductive layer. Therefore, by further providing the second piezoelectric element layer, the voltage VP2 (potential difference between the touch panel upper side electrode layer and the conductive layer) described above generated in accordance with the pressing on the display surface can be further increased. As a result, as described above, the accuracy of the pressure detection can be enhanced.

In the electronic device (display device 100) according to an eighth aspect of the present invention, it is desirable that the touch panel according to any one of the first to seventh aspects described above is included.

With this configuration, the same effect as the touch panel according to an aspect of the present invention is achieved.

ADDITIONAL NOTE

An aspect of the present invention is not limited to the embodiments described above, and various modifications may be realized within the scope of the claims, and embodiments obtained by appropriately combining the technical means disclosed in the different embodiments are also included in the technical scope of an aspect of the present invention. Furthermore, new technical features may be formed by combining the technical means disclosed in the embodiments.

REFERENCE SIGNS LIST 1, 2, 3, 4 touch panel
11 TFT substrate (pixel substrate)
13 ITO layer (conductive layer)
14 liquid crystal layer
15 TP lower side electrode layer (touch panel lower side electrode layer)
16, 26 piezoelectric element layer (first piezoelectric element layer)
17 BM (light shielding member)
18 CF substrate (color filter layer)
19 TP upper side electrode layer (touch panel upper side electrode layer)
90 display unit (display surface)
100 display device (electronic device)
460 second piezoelectric element layer
F finger (object)
VP voltage
VP1 voltage (potential difference between touch panel upper side electrode layer and touch panel lower side electrode layer)
VP2 voltage (potential difference between touch panel upper side electrode layer and conductive layer)

The invention claimed is:

1. A touch panel having a display surface, the touch panel comprising:
   a pixel substrate, a liquid crystal layer, and a color filter layer in order from a side farthest from the display surface,
   wherein when a direction from the pixel substrate toward the color filter layer is defined as an upper direction and a direction opposite to the upper direction is defined as a lower direction, the touch panel further comprises:
   a touch panel upper side electrode layer located above the color filter layer;
   a touch panel lower side electrode layer located below the color filter layer and above the liquid crystal layer;

a first piezoelectric element layer that generates a first pressure detection voltage in accordance with a pressing on the display surface;

a second piezoelectric element layer that generates a second pressure detection voltage in accordance with the pressing on the display surface; and a conductive layer located below the liquid crystal layer, wherein the touch panel upper side electrode layer and the touch panel lower side electrode layer are provided with electrodes for detecting a position where an object contacts or proximities the display surface, the first piezoelectric element layer is located between the touch panel upper side electrode layer and the touch panel lower side electrode layer, the second piezoelectric element layer is provided within the liquid crystal layer and is a spacer that maintains a thickness of the liquid crystal layer, a potential difference between the touch panel upper side electrode layer and the conductive layer is acquired as a total voltage that detects the pressing on the display surface, the total voltage is a sum of the first pressure detection voltage and the second pressure detection voltage, and the conductive layer is a transparent conductive material.

2. The touch panel according to claim 1, further comprising:

a light shielding member located above the first piezoelectric element layer, wherein the first piezoelectric element layer is disposed at a position covered with the light shielding member when viewed from the upper side.

3. The touch panel according to claim 1, further comprising:

a light shielding member located above the first piezoelectric element layer, wherein the second piezoelectric element layer is disposed at a position covered with the light shielding member when viewed from the upper side.

4. A display device comprising the touch panel according to claim 1.

* * * * *